United States Patent [19]
Harrison

[11] 3,980,348
[45] Sept. 14, 1976

[54] FLUID FLOW CONTROL VALVES

[75] Inventor: Anthony William Harrison, Birmingham, England

[73] Assignee: Girling Limited, Birmingham, England

[22] Filed: Feb. 7, 1974

[21] Appl. No.: 440,577

Related U.S. Application Data

[62] Division of Ser. No. 305,220, Nov. 10, 1972, abandoned.

[30] Foreign Application Priority Data

Nov. 13, 1971 United Kingdom............... 52798/71
Jan. 21, 1972 United Kingdom............... 2881/72

[52] U.S. Cl. .................. 303/21 F; 188/181 A; 91/422; 251/5; 91/461; 91/457
[51] Int. Cl.² ............... F15B 13/043; B60T 8/06; B60T 8/10
[58] Field of Search ............ 91/422, 431, 52, 416; 188/181 A; 303/21 F; 251/5

[56] References Cited
UNITED STATES PATENTS

| | | | |
|---|---|---|---|
| 2,520,374 | 8/1950 | Rockwell | 91/376 |
| 2,778,339 | 1/1957 | Mancusi, Jr. | 91/422 |
| 3,092,144 | 6/1963 | Green | 251/5 |
| 3,232,181 | 2/1966 | Blatt | 91/422 |
| 3,496,833 | 2/1970 | Kobelt | 91/431 |
| 3,502,001 | 3/1970 | Moore | 91/431 |
| 3,646,849 | 3/1972 | Smith | 91/52 |

*Primary Examiner*—Paul E. Maslousky
*Attorney, Agent, or Firm*—Scrivener Parker Scrivener and Clarke

[57] ABSTRACT

A diaphragm valve has a relatively long seating formed by a plurality of ribs which engage with one air operated diaphragm. An annular valve is provided by slotting the outer surface of an annular seating member which engages an endless diaphragm, alternate slots communicating with the inlet or outlet of the valve. A pneumatic actuator for a vehicle braking system is provided with internal valve means for controlling the flow of air through the movable wall carrying the actuating member. An anti-skid braking system employs such a pneumatic brake actuator, the internal valve means being operated by skid sensing means.

28 Claims, 17 Drawing Figures

FLUID FLOW CONTROL VALVES

This is a division of application Ser. No. 305,220, filed Nov. 10, 1972, now abandoned.

A fluid pressure actuator is provided with a valve controlling communication through the movable wall of the actuator, and the valve is remotely operable by fluid pressure to enable the actuator to be incorporated in an anti-skid braking system in which a control valve supplies the actuator valve with pressure fluid in the event of a skid signal to open the actuator valve and relieve the braking force. The actuator may be provided with additional remotely operable valves controlling connections to the respective chambers of the actuator.

This invention relates to an actuator for a vehicle braking system and more particularly to an actuator which is suitable for use in an anti-skid braking system of the kind in which the pressure differential across a movable wall of the actuator is reduced on the occurence of a skid signal.

According to one aspect of the invention an actuator for a braking system of a vehicle comprises a wall movable in a housing in response to differential fluid pressures applied to chambers in the housing on opposite sides of the movable wall, an actuating member attached to the movable wall and adapted to actuate a component of the braking system, a first valve located in the housing for establishing communication through the movable wall to equalise the pressures in both chambers, a first valve member of said first valve being directly operable by fluid pressure, and a fluid pressure connection extending from said first valve to the exterior of said housing to enable said first valve member to be remotely operated by fluid pressure, the condition of said first valve being unaffected by displacement of said movable wall relative to said housing.

The actuator may be used to actuate a wheel brake or a master cylinder applying hydraulic fluid to a wheel brake.

The valve of such an actuator may be controlled remotely by, for example, a control valve responsive to a skid sensing means so that in the event of a skid the pressure differential across the movable wall is reduced by opening of the actuator valve.

Additional remotely operable valves may be provided in the housing to control connections from either or both of the actuator chambers to the exterior of the housing.

Where an additional valve is provided for only one of the chambers the other chamber may be connected to the exterior of the actuator through a flow restrictor.

Preferably each valve incorporates a valve member in the form of a flexible diaphragm adapted to co-operate with a seat of the valve.

Usually in a diaphragm valve the length of the seating separating inlet and outlet spaces of the valve is made short in relation to the cross-sectional area of the inlet/outlet, and if a large flow of fluid across the seating is required the valve member is moved a relatively large distance away from the seating.

In valves where the valve member is a diaphragm it is particularly desirable to keep the distance between unsupported parts of the diaphragm small to avoid the diaphragm collapsing.

According to another aspect of the invention said first valve comprises a valve housing having an inlet and an outlet, a seating member incorporating a seating separating the inlet and outlet, said first valve member being supported on said seating in the closed position of the valve, and the ratio of the total length of the seating to the maximum span of the valve member unsupported by the seating in the closed position being substantially greater than three.

Such a valve may be made capable of passing a large volume of fluid in a short time for only a relatively small displacement of the valve member.

The seating member may have a plurality of ribs with spaces between the ribs constituting alternately inlet and outlet spaces of the valves.

In one construction the seating member has one continuous convoluted rib, effectively forming a plurality of ribs, the inlet and outlet spaces of the valve being disposed on opposite sides of the rib.

The rib or ribs of the seating member may be of increasing height in one direction, enabling the valve to give a differential flow across the seating member.

Conveniently the seating member has a slotted surface, the individual slots constituting alternately said inlet and outlet spaces, and the outer surface of the ribs between the slots constituting said seat.

In a preferred form of valve having such a slotted seating member the seating member is annular and is enclosed by an annular valve housing, the slots being in the outer surface of the seating member, and the diaphragm being an endless one.

Preferably the seating member divides the valve housing into three annular chambers, an inlet and an outlet chamber disposed on opposite sides of the seating member, and an intermediate chamber around the radially outer surface of the seating member, the inlet and outlet chambers communicating through alternate slots with the intermediate chamber in which pressure acts on the diaphragm.

Conveniently the valve housing has inlet and outlet ports disposed substantially parallel to the axis of the valve, and a pressure fluid port connected to said fluid pressure connection and being substantially radially disposed.

According to a further aspect of the invention actuators of the above kind may be incorporated in a fluid pressure operated braking system wherein a power control valve assembly is responsive to a skid sensing means, means being provided to connect the control valve assembly to said fluid pressure connection of the actuator, and the control valve assembly being arranged to open said first valve in the event of a skid signal to reduce the braking force.

When the actuator incorporates first and second valves the control valve assembly is preferably arranged such that a skid signal causes the second valve to close and the first valve to open.

When the actuator incorporates additionally a third valve that control valve assembly is preferably arranged also to close that valve on receipt of a skid signal.

The invention will now be further described, by way of example only, with reference to the accompanying drawings in which:

FIG. 15 is a section through a third form of the pneumatic actuator, The valve shown in FIGS. 1 and 2 is basically flat and is constructed from a two-part housing 1 between which is clamped a diaphragm valve member 2. The lower housing part 3 is the valve seating member and has a raised continuous convoluted rib 4 which forms the seating for diaphragm 2 and divides the housing into an inlet space A and an outlet space B connected respectively to inlet and outlet ports (not shown). A pilot pressure applied to the chamber 5 above the diaphragm 2 through a pilot pressure port (not shown) closes the valve. The diaphragm need only move upwardly through a small distance to allow a large volume of fluid to pass over the rib so the volume of fluid used from the source of the pilot pressure need only be small i.e., the response time of the valve is relatively fast. The single convoluted rib 4 is effectively the same as a plurality of ribs with the added advantage that all the inlet spaces A are interconnected within the housing, as are the outlet space B. The distance between adjacent ribs in any one line across the valve should be small enough to prevent extrusion or collapse of the diaphragm into the troughs between the ribs. For example this unsupported span of the diaphragm could be 0.1 inch and the length of the rib could be 10 inches so that the ratio of length of rib to unsupported span is 100. This valve also has the advantage of a long seating in relation to the cross-sectional area of the inlet or outlet so that a large volume of fluid, normally air, can be passed through the valve quickly. A single valve member cooperates with the whole seating and it only has to move a small distance from the seating e.g. 0.01 inch to open the valve.

Figure 1:
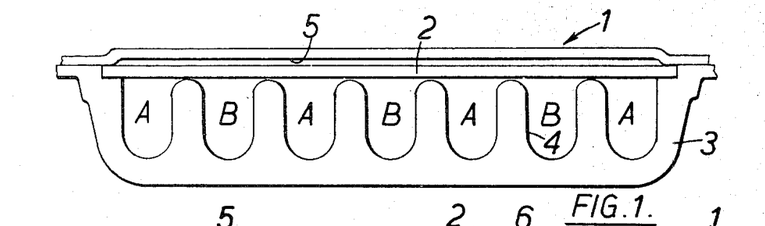
FIG. 1 is a diagrammatic cross-section of a valve suitable for incorporation in an actuator in accordance with the invention.
Figure 2:
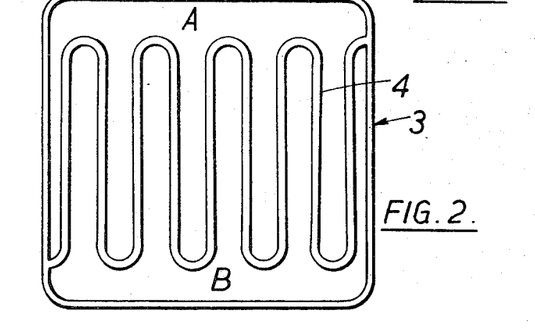
FIG. 2 is a plan view of a seating member for a valve of the kind shown in FIG. 1.
Figure 3:
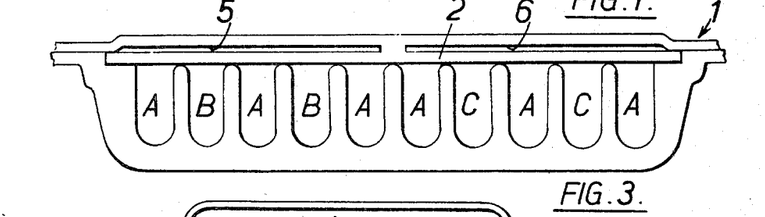
FIG. 3 is a diagrammatic cross-section of a three-way valve.

FIG. 3 illustrates how a three way valve can be constructed on the same principles. The valve housing 1 has a common inlet chamber A and two separate outlet chambers B and C corresponding to two separate pilot pressure chambers 5 and 6 above the diaphragm 4.

Figure 4:
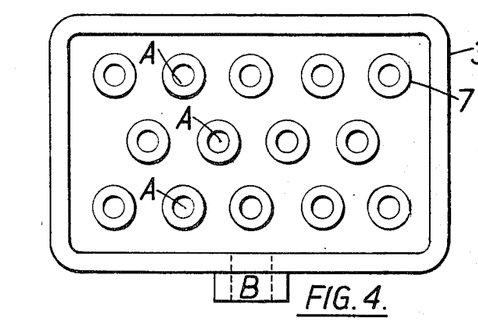
FIG. 4 is a plan view of a modified form of seating member.
Figure 5:
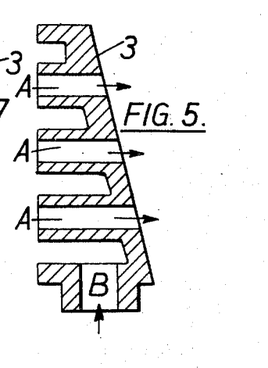
FIG. 5 is a cross-section of the seating member shown in FIG. 4.

FIGS. 4 and 5 show the seating member 3 of a further form of the valve. Here the ribs 7 are circular and increase in height towards the lower side of the seating member. This form of seating member is useful when it is necessary to vary the outlet flow from the valve. In this form of valve the maximum unsupported span of the diaphragm is the diameter of a circular rib 7 so that the ratio of length of rib to unsupported span can be increased by increasing the number of ribs. The ratio in the valve of FIGS. 4 and 5 is 44.

In yet another form of valve suitable for use in an actuator in accordance with the invention the seating member is slotted, the ribs between the slots forming the valve seating. It will be noted that a common feature of all the valves described so far is a single diaphragm co-operating with a ribbed seating member effectively having a plurality of ribs, each separating an inlet space from an outlet space of the valve.

Figure 6:
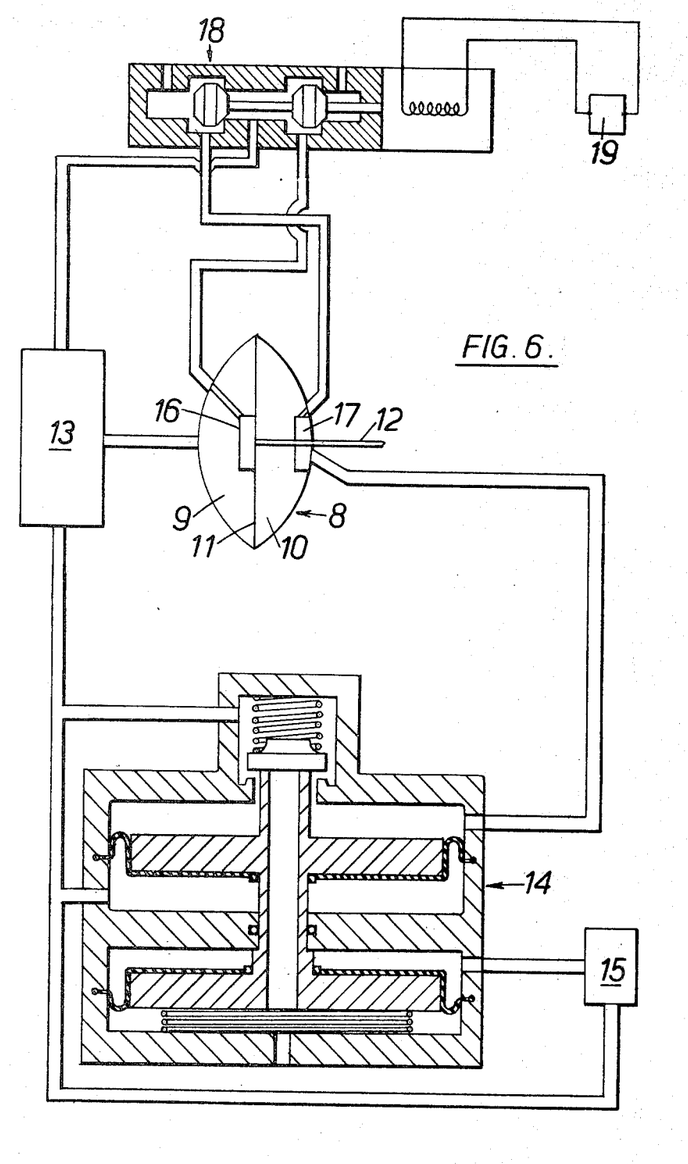
FIG. 6 is a diagrammatic layout of a braking system according to the invention.

In FIG. 6 there is shown a pneumatic anti-skid braking system in which a pneumatic actuator 8 is divided into a high pressure chamber 9 and a low pressure chamber 10 by a diaphragm 11 which carries an actuating member 12. The high pressure chamber 9 is connected directly to a supply of pressurized air 13 which is also connected to the low pressure chamber 10 through a relay valve 14 controlled by a treadle valve 15.

When the brakes are applied, high pressure fluid from the treadle valve 15 operates relay valve 14 to cut off the air supply to the low pressure chamber 10 and then to connect this chamber to exhaust. The differential pressure now established across diaphragm 11 moves the diaphragm to the right taking the actuating member 12 with it to actuate the brake. The relay valve 14 is arranged to balance the pressures in the high and low pressure chambers with the treadle valve pressure so that the driver has a feel of the brake.

A normally closed first valve 16 controls communication through diaphragm 11 and a normally open second valve 17 controls communication to the low pressure chamber 10 and is connected to relay valve 14. Both valves 16 and 17 are pneumatically operated by pressurised air controlled by solenoid control valve assembly 18 connected to skid sensing means 19.

When a skid signal is received by the solenoid control valve assembly 18, the valve assembly is operated to close valve 17 and open valve 16. Closing valve 17 isolates the low pressure chamber 10 from exhaust and opening valve 16 allows the pressure in the low and high pressure chambers to equalise, thus moving the diaphragm 11 and actuating member 12 to the left and reducing the braking effort. When solenoid valve assembly 18 reverts, valve 17 opens again and valve 16 closes, re-applying the brakes.

The actuator 8 and the valves 16 and 17 will now be described in detail. The actuator shown in FIGS. 7 – 9 has a housing 21 made up from three parts. Two dished housing parts 22 and 23 have co-operating peipheral flanges 24 which are held together by a clamping member 25. The periphery of the annular diaphragm 11 is held between the flanges 24. The third housing part 27 is also dished-shaped and has an out-turned peripheral flange 28 which is bolted to the housing part 23.

Figure 7:
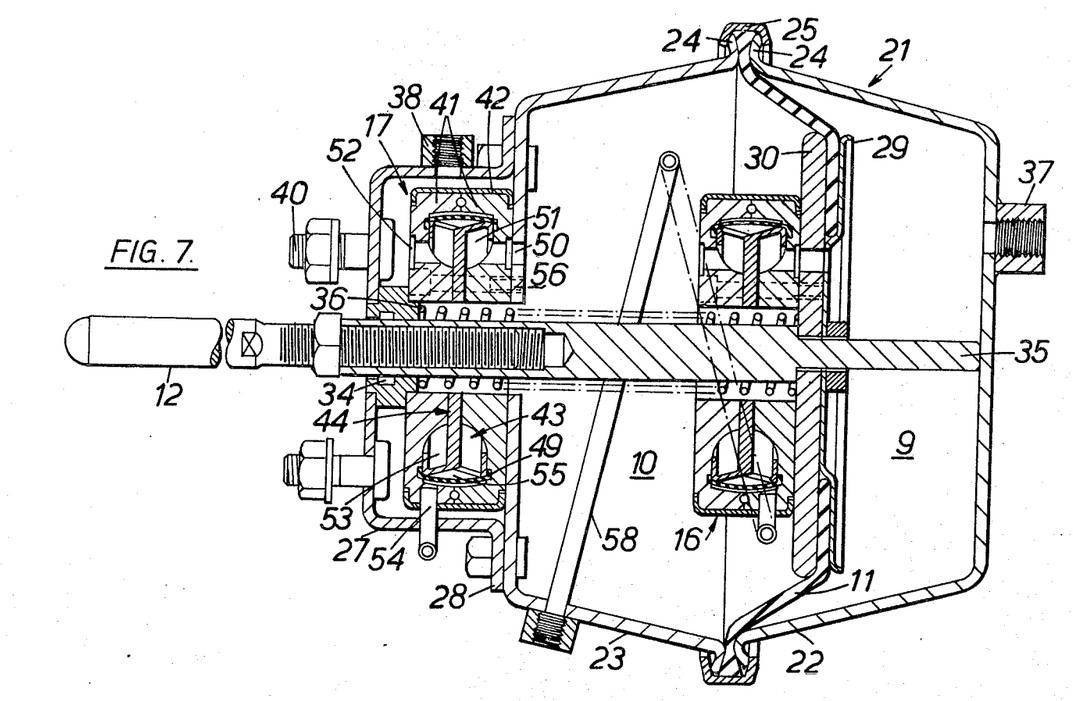
FIG. 7 is a longitudinal section through a pneumatic brake actuator according to the invention.
Figure 8:
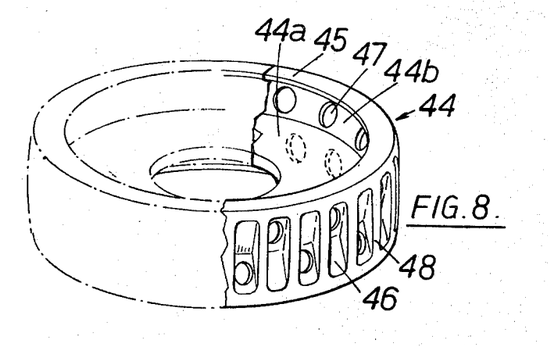
FIG. 8 is a perspective view of the seating member of a valve in the actuator of FIG. 7.

The inner edge of the diaphragm 11 is clamped between a plate 29 and a backing member 30 each provided with an axial bore into which the actuating member 12 is screwed. The actuating member extends through the low pressure chamber 10 and through aligned openings in housing parts 23 and 27 engaging a seal 34 in the wall of housing part 27. An extension 35 on the screwed end of the actuating member 12 is adapted to abut the housing part 22 to hold the diaphragm 11 in the unactuated position.

A compression spring 36 is co-axially located around the actuating member 12 and acts between a retainer for seal 34 and backing member 30 to hold the diaphragm 11 in the unactuated position. A port 37 in housing part 22 is adapted to connect chamber 9 to the air supply 13 and a port 38 in housing part 27 is adapted to connect chamber 10 to the relay valve 14 shown in FIG. 6. Bolts 40 on the outer wall of housing part 27 are adapted to secure the actuator 8 to a wedge-type wheel brake (not shown).

The valves 16 and 17 inside the actuator housing are identical. Each valve comprises two annular housings parts 41 held together by an encircling peripheral band 42. Intermediate the inner and outer edges each of the mating faces of the housing parts 41 is formed with a registering annular groove, both grooves in the completed housing forming an annular passage 43. Clamped between the housing parts 41 and extending from their radially inner edges into the annular passage 43 is an annular seating member 44. The annular seating member 44 is shown in perspective in FIG. 8 and comprises an inner disc portion 44a extend outwardly to a wedge portion 44b which terminates in a ring portion 45. Circumferentially spaced slots 46 extend around the ring portion 45, each slot being elongated in the axial direction and wedge-shaped in the radial direction so that opposite walls of the slot in the axial direction are inclined towards each other. Each slot 46 is provided with an opening 47 through one of these axial walls, the opening 47 being placed in opposite walls in successive slots. The portions of the ring portion 45 between the slots 46 form a series of ribs 48 that act as the seating of the valve. Around the seating member 44 a peripheral, flexible sealing member 49 is located by edge portions held between the flanges 45 and the walls of the passage 43. In its normal position sealing member 49 is slighty spaced away from the outer radial wall of passage 43.

Figure 9:
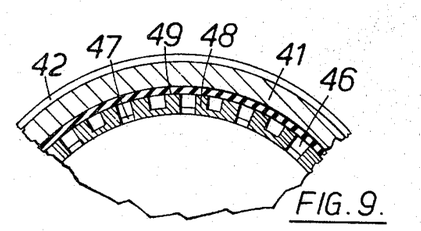
FIG. 9 is a cross-sectional detail of the valve in FIG. 7.

The seating member 44 divides the passage 43 into three annular chambers, each chamber adjacent to two others. Inlet ports 50 in one housing part 41 parallel to the axis lead into the inlet chamber 51; aligned outlet ports 52 in the other housing part 41 lead from the outlet chamber 53, and a radial control port 54 leads into the intermediate chamber 55.

Second valve 17 is secured to the end wall of actuator housing part 23 by bolts 56 so that inlet ports 50 register with openings leading into low pressure chamber 10. Outlet ports 52 open into housing part 27 and are in communication with port 38. Radial control port 54 is connected to piping leading to solenoid control valve 18 shown in FIG. 6. Valve 17 surrounds actuating member 12 and spring 26.

First valve 16 is secured to backing member 30 by bolts 50 so that inlet ports 50 register with aligned openings in backing member 30 and plate 29, the openings leading into high pressure chamber 9. Outlet ports 52 open into low pressure chamber 10. Radial port 54 is connected to flexible piping 58 which leads through the side wall of housing part 23 to solenoid control valve 18.

In the normal condition of the actuator valve 16 is shut by a supply of air passing through solenoid control valve 18, through piping 58, to intermediate chamber 55, forcing sealing member 49 into contact with ribs 48 and closing the slots 46, thus isolating inlet and outlet chambers 51 and 53. Valve 17 is open, the radial port 54 being connected through solenoid valve 18 to exhaust, thus allowing communication between the inlet and outlet chambers via openings 48. In skid conditions valve 17 shuts and valve 16 opens.

Figure 10:
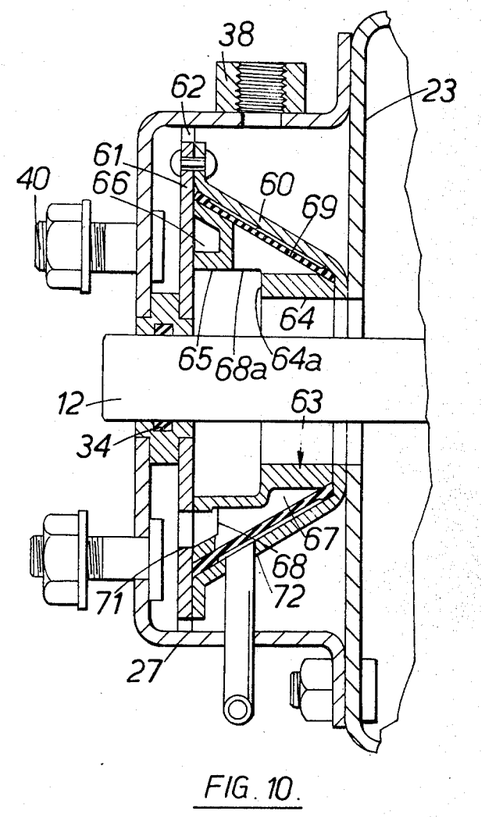
FIG. 10 is a section through a modified form of the valve in FIG. 7, FIGS. 11 and 12 are perspective views of the seating member of the valve in FIG. 10.
Figure 11:
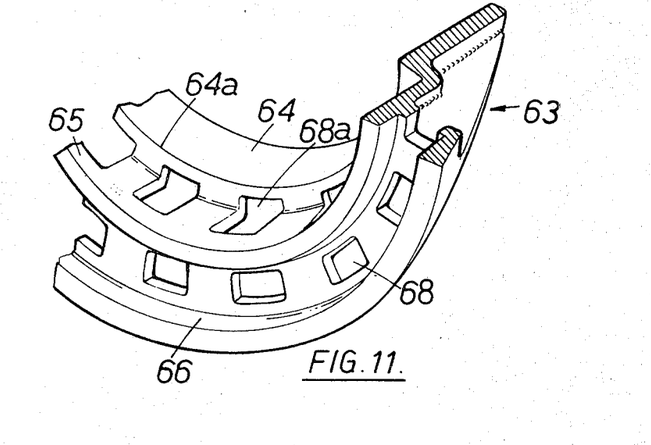
Figure 12:
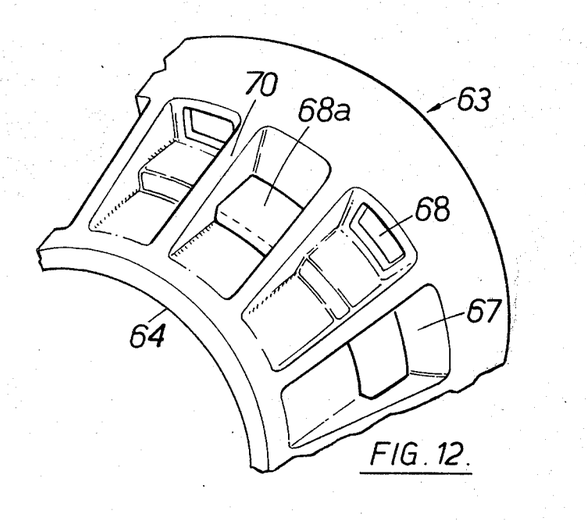

FIGS. 10 – 12 show a modified form of annular valve fitted in the housing part 27. This valve comprises a housing formed from a frusto-conical pressing 60 riveted to a base plate 61, both the pressing 60 and the base plate having axial openings. The valve housing is secured in the actuator housing part 27 around the actuating member 12 and with the opening in pressing 60 registering with the opening in the housing part 23. The periphery of the base plate 61 is extended outwardly to contact the sides of housing part 27 and the extended portion is slotted at 62 to allow communication between the two spaces in housing part 27 formed by the base plate 61.

Located within the valve housing is an annular seating member 63 two perspective views of which are shown in FIGS. 11 and 12. The outer surface of the seating member 63 is frusto-conical while the inner surface is formed as a stepped cylindrical bore, the smaller diameter bore 64 being adjacent the housing part 23 and the larger diameter bore 65 being adjacent the base plate 61. An annular channel 66 is formed in the base plate end of the seating member 63, co-axial with the bore 65. Slots 67 are circumferentially spaced around the outer surface of the seating member 63, the slots being elongated in the axial direction and extending across the step 64a at the change in diameter between bores 64 and 65. In the radial direction the slots are wedge-shaped being deeper in the direction of the base plate 61 and having a step in the base of the wedge. Openings 68 are formed in the base of the wedge-shaped slot 67, these openings leading into channel 66. Openings 68a are formed in the radial wall of the slot 67 by removing the step in the slot, these openings 68a lead into bore 65. Each alternate slot 67 has either an opening 68 or an opening 68a. A flexible sealing member 69 is held between the seating member 63 and the side wall of pressing 60. The ribs 70 between the slots 67 forming a seating for the sealing member 69.

The actuator end of bore 64 forms the inlet port of the valve; the bore 66 forms the inlet chamber; the space between seating member 63 and the side wall of the pressing forms the intermediate chamber; the channel 66 forms the outlet chamber; openings 71 in base plate 61 leading into the outlet chamber form the outlet ports; and an opening 72 in the side wall of pressing 60 forms the radial control port.

It will be seen that the inlet and outlet ports 64, 71 are parallel to the axis of the valve and the control port 72 is substantially radial. The inlet, outlet and intermediate chambers are annular, each adjacent to the other two, and co-axial. Furthermore the openings 68 and 68a into the intermediate chamber face the same general direction. This modified valve can also be used in place of valve 16. The chief advantage of the modified valve is that the seating member can be moulded more easily from plastics material or light alloy since the slots and openings can all be formed with a two-part mould parting in the axial direction.

Figure 13:
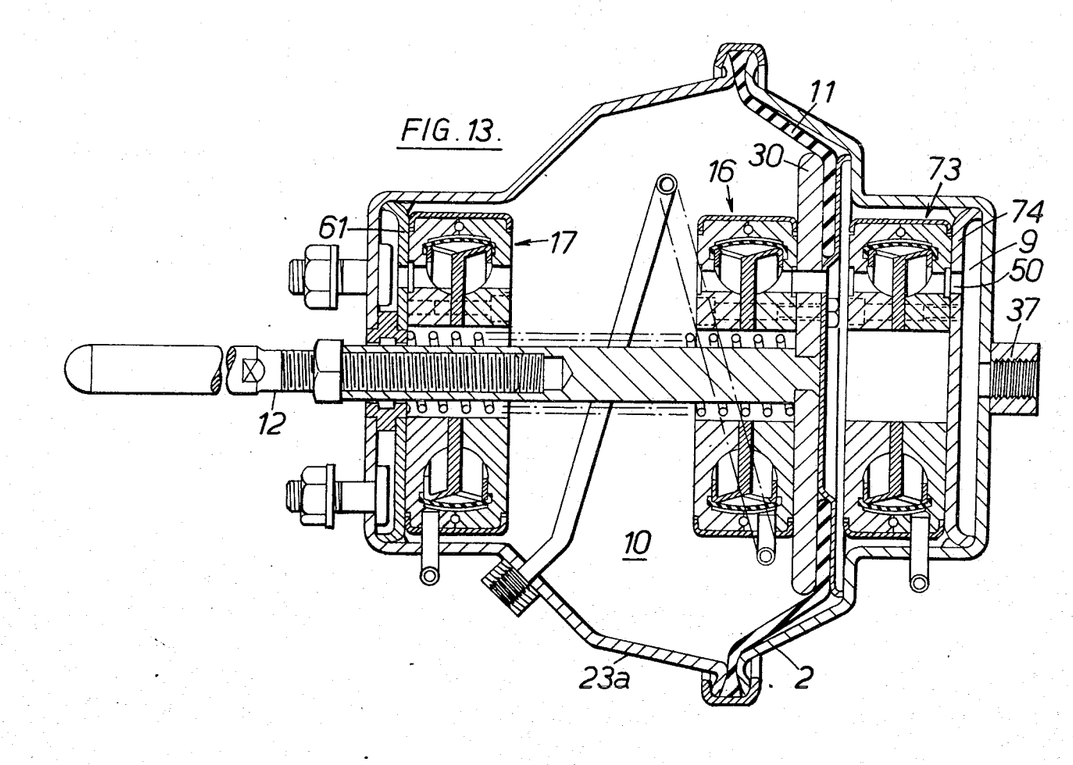
FIG. 13 is a section through a second form of the pneumatic actuator.

In a second embodiment of the actuator 8 as shown in FIG. 13 many of the features are the same as in the actuator of FIG. 7 and these have been given the same reference numerals where it is considered necessary.

The main differences are that housing parts 23 and 27 have been combined into a single part 23a. The second valve 17 is bolted onto a base plate 61 secured in housing part 23a. Port 38 has been replaced by exhaust ports (not shown) in the end wall of housing part 23a. The actuating member 12 has been secured to the backing member 30 and the extension 35 omitted. To provide a rest position for the diaphragm 11, the housing part 22 has been joggled inwardly.

An annular third valve 73 identical with the valves 16 and 17 has been located in the high pressure chamber 9. This valve 73 is bolted onto a supporting plate 74 which has an opening registering with the inlet port of valve 73.

Figure 14:
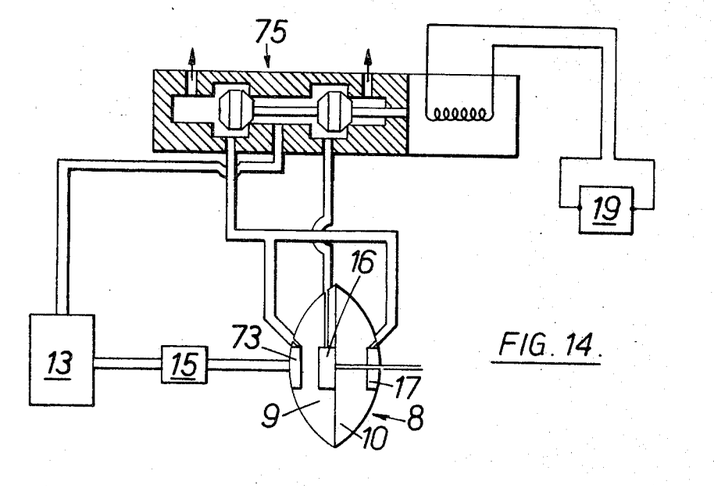
FIG. 14 is a diagrammatic layout of a second braking system.

The actuator shown in FIG. 13 is adapted for use in the braking system shown in FIG. 14. In the normal state of the actuator both the low and high pressure chambers 9 and 10 are connected to atmosphere and the diaphragm is biassed to the right by the spring 36. Valves 17 and 73 are open and valve 16 is shut.

When the brakes are applied by treadle valve 15 high pressure air is introduced into the high pressure chamber 9 via port 37, establishing a pressure differential across the diaphragm 11 which moves the actuating member 12 to the right to apply the brakes.

When the solenoid control valve assembly 75 shown in FIG. 14 receives a skid signal from skid sensing means 19, the control port of valve 16 is connected to exhaust opening the valve, while the control ports of 17 and 73 are pressurised closing these valves. Thus the low pressure chamber 10 is isolated from the atmosphere, the high pressure chamber 9 is isolated from the air supply 13 and communication is established through the diaphragm to equalise the pressure in the two chambers. When this occurs the actuating member 12 is moved to the left and the braking effort reduced.

When the solenoid valve 75 reverts valves 16, 17, and 73 are switched to their original condition and the brake is re-applied.

As in the first embodiment the modified form of annular valve as shown in FIG. 10 can be used instead of valves 16, 17, or 73.

Figure 15:
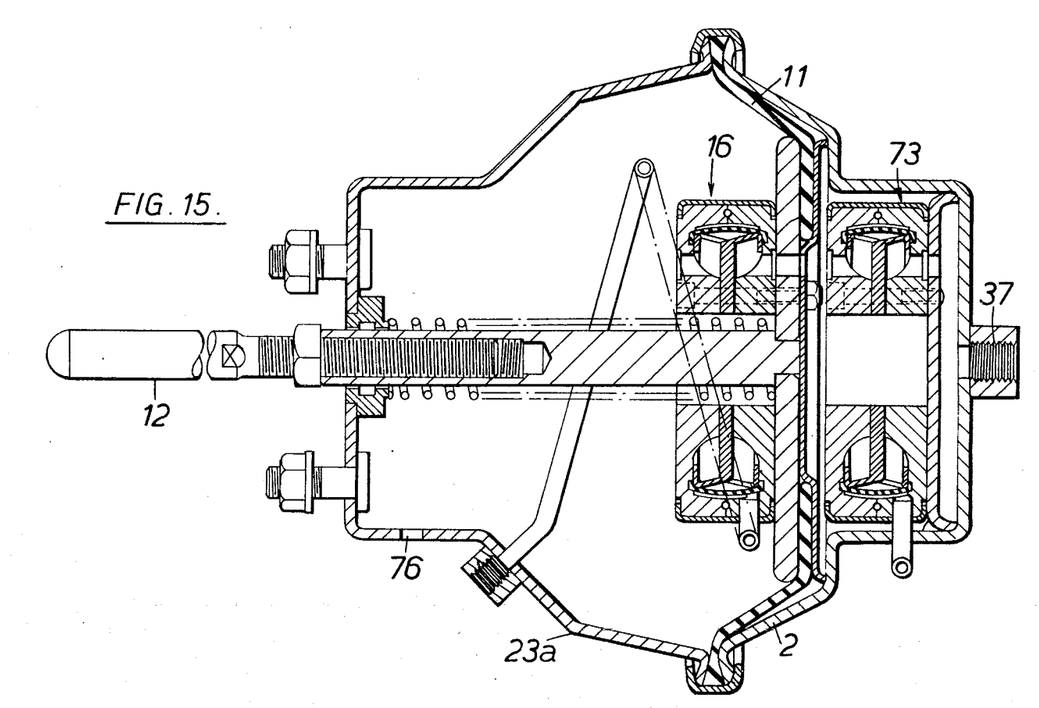

A third embodiment of the actuator 8 is shown in FIG. 15. It is basically the same as the actuator of FIG. 13 except that the annular valve 17 and the exhaust ports through the end wall of housing part 23a have been replaced by an opening 76 in the wall of the housing part 23a. This opening 76 acts as an outlet means as a flow restrictor for air being exhausted from the low pressure chamber. The valve 73 constitutes the second valve of this actuator. This actuator is used in the same system as that shown in FIG. 14 except that the connection from solenoid control valve 75 to valve 17 is omitted. When the brakes are applied by treadle valve 15 high pressure air is introduced into the high pressure chamber 9 and air is exhausted from low pressure chamber 10 through the flow restrictor 76 which is large enough not to have any appreciable effect in slowing down the rate of brake application, i.e., the rate of pressure rise in the low pressure chamber 10 is small compared with the rate of pressure rise in the high pressure chamber 9.

When the solenoid control valve assembly 75 shown in FIG. 14 receives a skid signal from the skid sensing means 19, the control port of first valve 16 is connected to exhaust, opening the valve while the control port of second valve 73 is pressurised, closing the valve. Thus the high pressure chamber 9 is isolated from the air supply and communication is established through the diaphragm to equalise the pressure in the two chambers. The size of the flow restrictor 76 is chosen so that the rate of pressure decay in the low pressure chamber 10 is small compared with the rate of pressure rise in this chamber when valve 16 opens.

In some earlier braking systems the air in the high pressure chamber had to be dumped to atmosphere when a skid signal was received and this wasted pressurised air. In the actuator of FIGS. 13 and 15 the air in the high pressure chamber is shared across the diaphragm so that its pressure is only reduced by a percentage depending on the relative volumes of the two chambers, i.e., there is a two stage drop in pressure as the air flows from high pressure chamber to low pressure chamber, and then to exhaust. Therefore there is some pressure left to re-apply the brakes when valve 75 reverts and not so much air is required from the supply. Thus the actuator is quicker to act and uses less air. The actuator of FIG. 15 requires one less annular valve than the actuator of FIG. 13.

The actuator of FIG. 7 is not quite so economical with air since some is lost every time you apply the brakes but it is simpler and cheaper to make than the actuator of FIG. 13 since it only requires two annular valves. It does have the advantage that the capacity of the air reservoir 13 can be reduced since the high pressure chamber 9 can be made large enough to store most of the requirements.

All the embodiments do away with external piping to dump valves, so reducing the volumes of air that have to be moved and so shortening the response time of the actuators.

It is desirable to have some form of fluid flow control on the low pressure chamber of the actuator 8 since it has been found that a valve which is fluid biassed in one direction will move more quickly in the opposite direction if there is fluid pressure acting in that opposite direction than if the movement is caused only by relaxation of the biassing pressure. In the actuator of FIG. 13 valve 17 shuts on a skid signal so that the low pressure chamber 10 is isolated from the atmosphere and a back pressure builds up quickly to hasten the opening of valve 16. In the actuator of FIG. 15 the flow restrictor 76 achieves the same effect without employing a valve.

Figure 16:
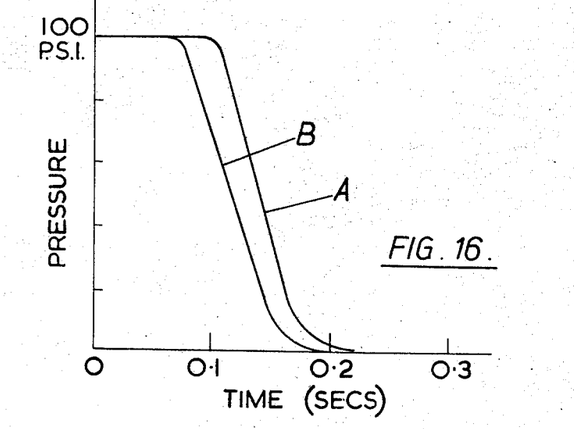
Figure 17:
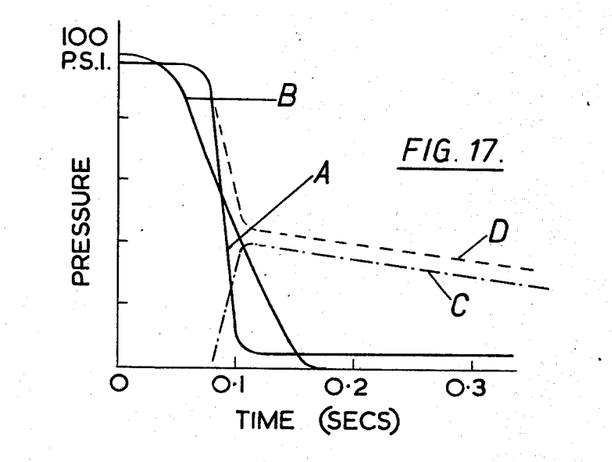

The effect of back pressure is illustrated in FIGS. 16 and 17. FIG. 16 shows the rate of fall of effective brake pressure (Curve A) in relation to the fall in the pilot pressure on valve 16 (Curve B) when a skid signal is received in an actuator where air is freely exhausted from the low pressure chamber to atmosphere. FIG. 17 shows how the effective brake pressure (A) falls off more rapidly in the actuator of FIG. 15. The dotted lines (C and D) illustrate the pressure changes occurring in the low and high pressure chambers respectively on a skid signal. It will be noted that the rate of pressure rise in the low pressure chamber due to the restrictor 76 is greater than the rate of pressure decay.

I claim:

1. A fluid-pressure operated actuator for a braking system of a vehicle comprising an actuator housing, a wall movable in said housing in response to differential fluid pressures applied to chambers in the housing on opposite sides of the movable wall, an actuating member attached to the movable wall and adapted to actuate a component of the braking system, a first valve located in the housing for establishing fluid communication through the movable wall to equalise the pressures in both chambers, said first valve comprising a valve housing having an inlet and an outlet, a seating member incorporating a seating separating the inlet and outlet, and a single valve member directly operable by fluid pressure and supported on the seating in the closed position of the valve, the ratio of the total length of the seating to the maximum span of the valve member unsupported by the seating in the closed position being substantially greater than three, and a fluid pressure connection extending from said first valve to the exterior of said actuator housing to enable said valve member to be remotely operated by fluid pressure, the condition of said first valve being unaffected by displacement of said movable wall relative to said actuator housing.

2. An actuator as in claim 1 wherein the valve member is a flexible diaphragm.

3. An actuator as in claim 2 wherein the seating member is ribbed each rib separating the inlet from the outlet thereby forming a relatively long seating.

4. An actuator as in claim 3 wherein the seating member has a plurality of ribs separating spaces connected alternately to the inlet and outlet.

5. An actuator as in claim 4 wherein the surface of the seating member is slotted, the individual slots being connected alternately to the inlet and outlet and the outer surface of the ribs between the slots forming the seating.

6. An actuator as in claim 5 wherein the valve housing is annular and encloses the seating member, which is also annular and has a slotted radially outer surface, and an endless diaphragm co-operates with the ribs between the slots.

7. An actuator as in claim 6 wherein the seating member divides the valve housing into three annular chambers, an inlet and outlet chamber on opposite sides of the seating member and an intermediate chamber around the radially outer surface of the seating member, the inlet and outlet chambers communicating through alternate slots with the intermediate chamber in which pressure fluid is adapted to act on the diaphragm.

8. An actuator as in claim 7 wherein the valve housing has inlet and outlet ports disposed substantially parallel to the axis of the valve and a pressure fluid port substantially radially disposed.

9. An actuator as in claim 8 wherein the annular seating member comprises a radially innermost disc portion which widens into a wedge portion which in turn terminates in a ring portion, the slots extending from the ring portion into the wedge portion.

10. An actuator as in claim 8 wherein the outer surface of the annular seating member is frusto-conical and the inner surface is formed as a stepped cylindrical bore, the larger diameter bore being at the larger diameter end of the seating member and being surrounded by an annular channel, and the slots in the outer surface extend axially across the step in bore diameter, alternately communicating with the annular channel and the bore which constitute said inlet and outlet chambers.

11. An actuator as in claim 10 wherein the seating member is a moulding.

12. An actuator as in claim 1 comprising a second valve located in said actuator housing and controlling a connection from one of said chambers to the exterior of said actuator housing, said second valve being remotely operable from the exterior of said actuator housing by fluid pressure.

13. An actuator as in claim 12 comprising a third valve located in said actuator housing and controlling a connection from the other of said chambers to the exterior of said actuator housing, said third valve being remotely operable from the exterior of said actuator housing by fluid pressure.

14. An actuator as in claim 1 wherein the actuating member extends axially from the movable wall, a return spring is located co-axially around the actuating member, and the first valve is an annular valve secured to the movable wall and located co-axially around the return spring.

15. An actuator as in claim 1 wherein said first valve is secured to said movable wall, and said fluid pressure connection to the exterior of said actuator housing is flexible.

16. A fluid-pressure operated actuator for a braking system of a vehicle comprising a wall movable in a housing in response to differential fluid pressures applied to chambers in the housing on opposite sides of the movable wall, an actuating member attached to the movable wall and adapted to actuate a component of the braking system, a first valve located in the housing for establishing communication through the movable wall to equalise the pressures in both chambers, a first valve member of said first valve being directly operable by fluid pressure, and a fluid pressure connection extending from said first valve to the exterior of said housing to enable said first valve member to be remotely operated by fluid pressure, the condition of said first valve being unaffected by displacement of said movable wall relative to said housing.

17. An actuator as in claim 16 incorporating in said housing a second valve remotely operable from the exterior of said housing by fluid pressure and controlling a connection from one of said chambers to the exterior of said housing.

18. An actuator as in claim 17 wherein said one chamber is the chamber the pressurisation of which causes said actuating member to be urged outwardly of said housing.

19. An actuator as in claim 18 wherein a connection from the other of said chambers to the exterior of said housing comprises a flow restrictor.

20. An actuator as in claim 17 wherein said first and second valves are each annular valves having a common axis to the plane of said movable wall.

21. An actuator as in claim 17 incorporating in said housing a third valve remotely operable from the exterior of said housing by fluid pressure and controlling a connection from the other of said chambers to the exterior of the housing.

22. An actuator as in claim 16 wherein said first valve is secured to said movable wall, and said fluid pressure connection from said first valve to the exterior of said housing is flexible.

23. An actuator as in claim 22 wherein said first valve is an annular valve having its axis generally normal to the plane of said movable wall.

24. A fluid pressure operated braking system for a vehicle including skid sensing means, an actuator comprising a wall movable in a housing in response to differential fluid pressures applied to chambers in the housing on opposite sides of the movable wall, an actuating member attached to the movable wall and adapted to actuate a component of the braking system, a first valve located in the housing for establishing communication through the movable wall to equalise the pressures in both chambers, a first valve member of said first valve being directly operable by fluid pressure, and a fluid pressure connection extending from said first valve to the exterior of said housing to enable said first valve member to be remotely operated by fluid pressure, the condition of said first valve being unaffected by displacement of said movable wall relative to said housing, a fluid pressure control valve assembly responsive to said skid sensing means, and means connecting said control valve assembly to said fluid pressure connection, the control valve assembly being arranged to open said first valve in the event of a skid signal.

25. A fluid pressure operated braking system for a vehicle as in claim 24 wherein said actuator incorporates in said housing a second valve remotely operable from the exterior of said housing by fluid pressure and controlling a further connection from one of said chambers to the exterior of said housing and said system includes means connecting said control valve assembly to said further connection, said control valve assembly being arranged to close said second valve in the event of a skid signal.

26. A fluid pressure operated braking system as in claim 25 wherein said actuator incorporates in said housing a third valve remotely operable from the exterior of said housing by fluid pressure and controlling an additional connection from the other of said chambers to the exterior of said housing, and said system includes means connecting said control valve assembly to said additional connection, said control valve assembly being arranged to close said third valve in the event of a skid signal.

27. A fluid pressure operated braking system as in claim 25 wherein said chamber is the chamber the pressurisation of which causes said actuating member to be urged outwardly of said housing, and the housing is provided with outlet means for exhausting the other of said chambers, a flow restrictor being incorporated in said outlet means.

28. A fluid pressure operated braking system as in claim 24 wherein said first valve comprises a valve housing having an inlet and an outlet, a seating member incorporating a seating separating the inlet and outlet, said first valve member being supported on said seating in the closed position of the valve, and the ratio of the total length of the seating to the maximum span of the valve member unsupported by the seating in the closed position being substantially greater than three.

* * * * *